June 10, 1969     L. A. HUGHES     3,449,081
TEST KIT
Filed March 29, 1965     Sheet 1 of 2
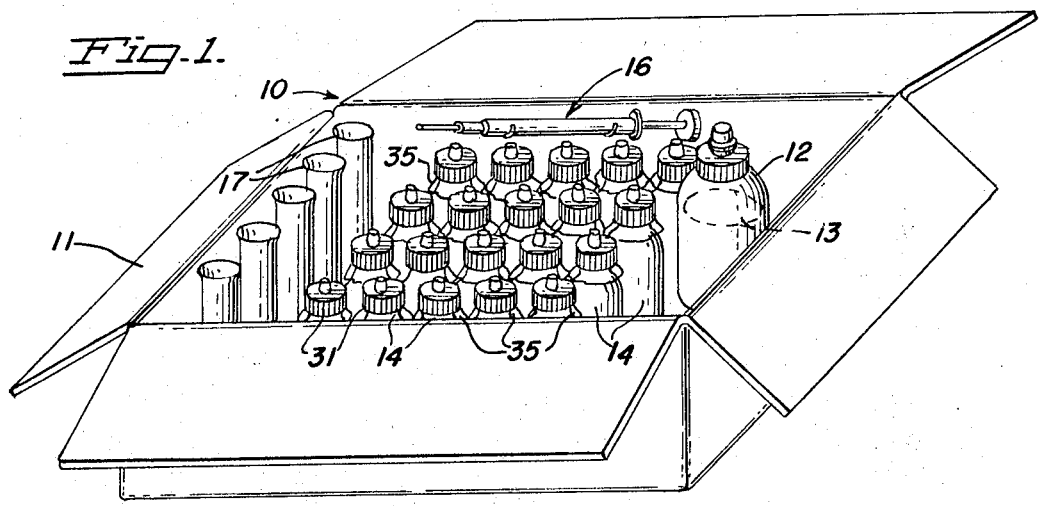
Fig. 1.
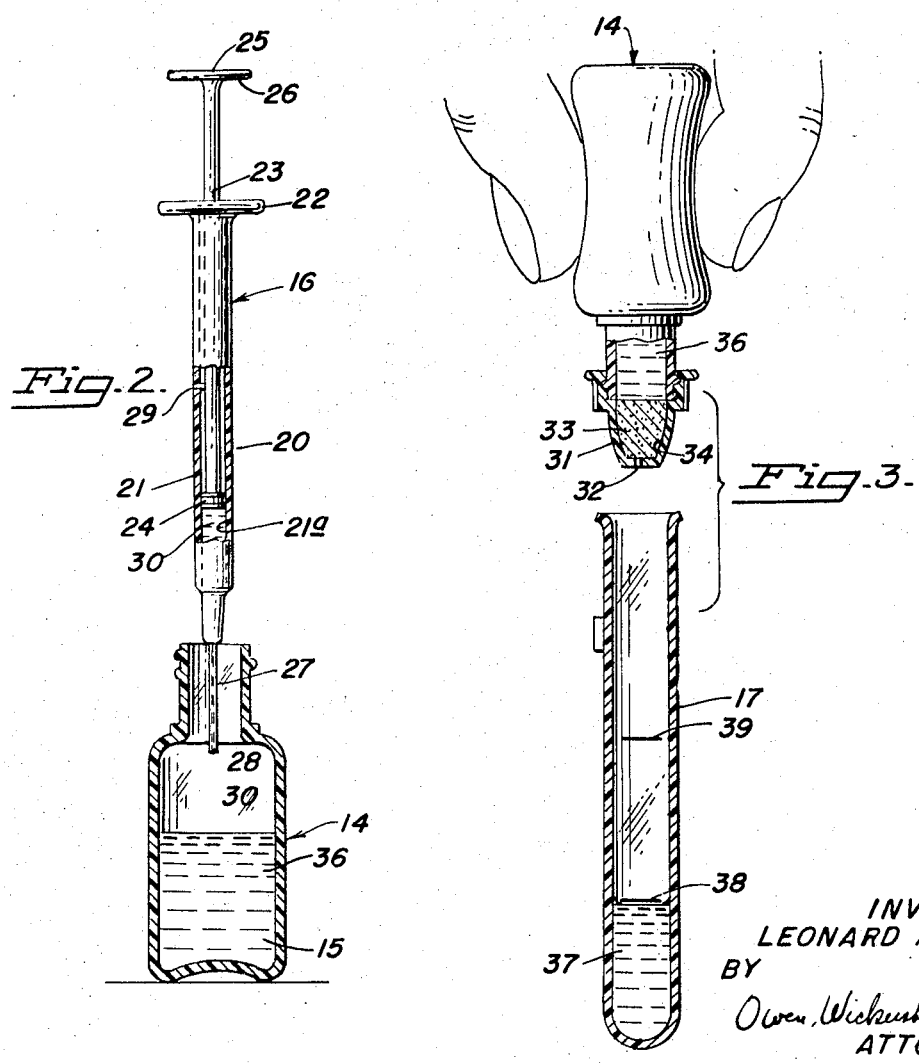
Fig. 2.
Fig. 3.
INVENTOR
LEONARD A. HUGHES
BY
Owen, Wickersham & Erickson
ATTORNEYS

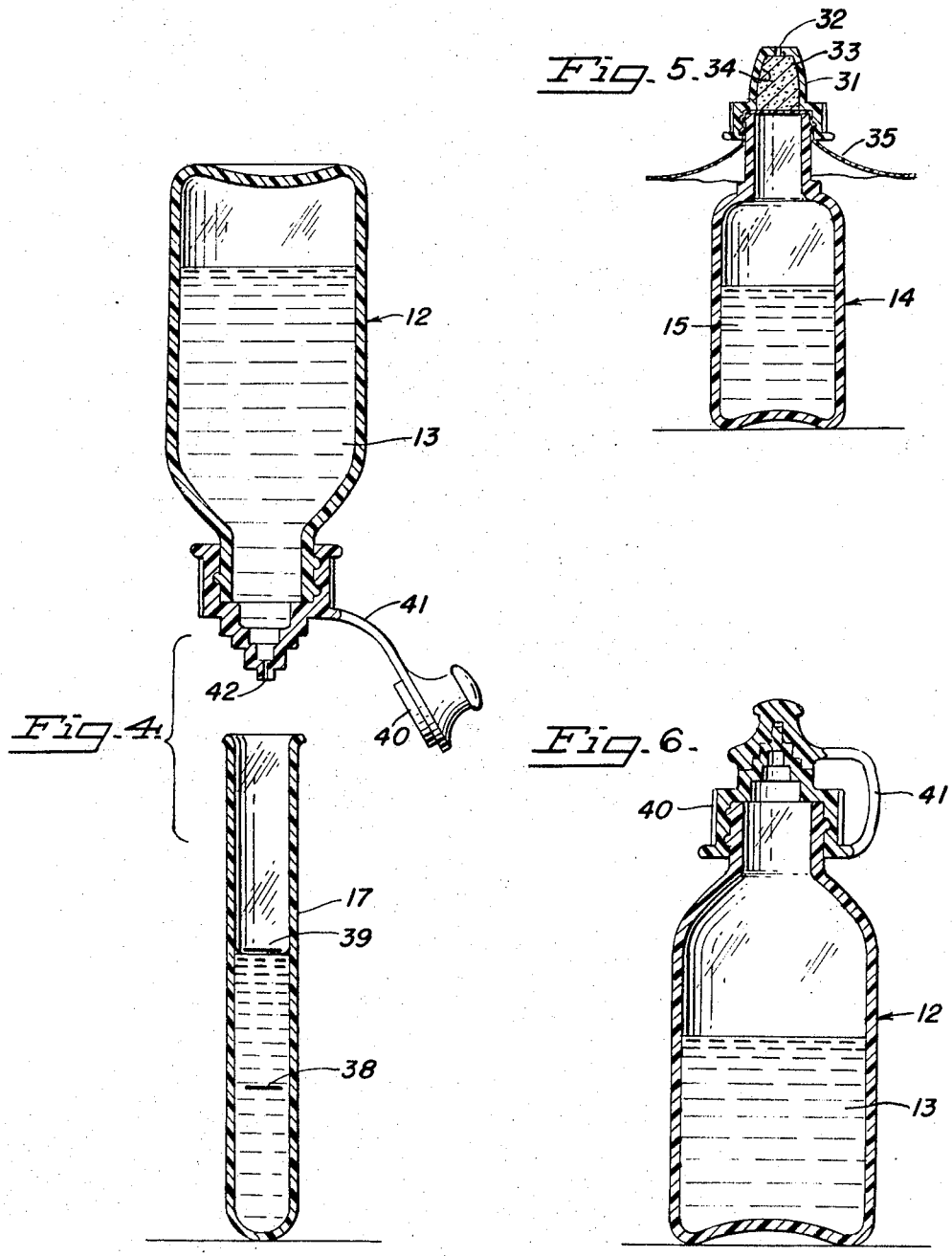

United States Patent Office 3,449,081
Patented June 10, 1969

3,449,081
TEST KIT
Leonard A. Hughes, Oakland, Calif., assignor to Electronic Instrument Co., Berkeley, Calif., a corporation of California
Filed Mar. 29, 1965, Ser. No. 443,490
Int. Cl. B01d 37/04, 27/04
U.S. Cl. 23—253                                11 Claims

ABSTRACT OF THE DISCLOSURE

A kit for performing blood tests comprising: (1) A plurality of first squeeze bottles each containing an identical premeasured quantity of a first reagent and having a removable cap with an opening and filter material in the removable cap, so that upon inversion each bottle becomes a pressure filter. Plastic film in each first squeeze bottle, normally held on by the cap, prevents contact of the first reagent with the filter material during storage and transportation. (2) A measuring syringe having a piston-cylinder arrangement with a stop for the syringe which limits intake to a specific amount of liquid, the stop being set to relate this specific amount to the quantity of the first reagent in each of the first squeeze bottles so that when a sample is drawn by the syringe, it premeasures an amount for use with the premeasured first reagent. (3) A plurality of colorimeter cuvettes having at least two marking lines, a lower one for filtrate from a first squeeze bottle after a syringe sample has been added to the reagent in the first squeeze bottle and the precipitate filtered therefrom, as indicated in (1). (4) At least one second squeeze bottle containing a second reagent which is added to the cuvette to bring the quantity from the lower marking line to an upper one. The pressure filter unit and measuring syringe are notable in themselves.

---

This invention relates to a kit for performing certain types of chemical tests, such as tests relating to the chemical composition of the blood. It also relates to certain equipment used in the kit such as a novel pressure filter and a novel syringe. It also relates to a novel method of performing blood composition tests.

Heretofore, tests involving the chemical composition of the blood, such as tests for the amount of uric acid in the blood, have usually been done by medical laboratories rather than by individual physicians. The reasons has been that the tests have been complex and have required a relatively large amount of equipment. For example, a typical uric acid test was generally run as follows: First a suitable blood sample was drawn by a syringe and deposited in a tube that was put into a centrifuge to separate out the serum. Then a pipette was used to carefully measure a specified amount of the serum into a container and a protein coagulant was measured separately by another pipette and put into the same container; the two were then shaken together to coagulate the protein. Then the sample was again centrifuged or allowed to filter slowly through filter paper into a suitable container. A measured amount of the filtrate was then added to two color producing reagents that were separately measured by separate pipettes, and then the mixture was placed in a cuvette that was inserted into a colorimeter and the color determined.

The relative complexity of the test along with the amount of equipment concerned meant that the physician could rarely afford to run the test himself or even to have it run in his office by one of his assistants. That, of course, meant he had to wait for the results, sometimes a full day. One result was that in sending the serum samples out to a laboratory, he ran a risk of someone's getting the samples mixed. The procedure was usually quite uneconomical unless there were several samples from different patients, and in any event, the charge by the laboratory was relatively large cost. Also, the fact that the test was performed by another man not under the physician's supervision meant that any indications along the way were unavailable to the physician, who could look only at the final results, usually given on a slip of paper from the laboratory.

The kit of this invention enables the physician to run the test himself or to have an assistant do it under his supervision. The tests can be run quickly, taking only a few minutes for the entire test, yet the test is done at least as well and with as sure results as he would obtain from the laboratory. In fact, because of his complete supervision of all the steps and because of the foolproof nature of the kit, the results tend to be more accurate than were obtained by well equipped laboratories. No time lag is involved instead of having to wait a day or two for the results from the laboratory, and the expense is quite small.

One reason for the time consuming nature of the previous tests was their reliance upon sets of pipettes to measure each of the various quantities, with the skill required to use the pipettes properly. Then, of course, there was always the necessity for cleaning and drying the pipettes afterwards.

The present invention eliminates the use of pipettes by providing certain premeasured units and certain measuring marks on the cuvette which is used for the colorimeter test. Also, the measurement of the quantity of serum is made quite simple, because the invention provides a novel syringe which is able to go from one sample to another without being cleaned or dried, and which measures the exact amount automatically.

Another time-consuming feature was the centrifuging or filtration of the coagulated serum. Centrifuging took time, and the equipment was bulky. Filtration as done heretofore consumed even more time, waiting for the precipitated proteins to be removed by the filter paper. Pressure filters were expensive and were quite inconvenient. The present invention solves this problem by providing that a premeasured quantity of the reagent used to coagulate the blood is prepackaged in a bottle which has as its cap an element that can be used as the filter. Moreover, the bottle itself is used to supply the pressure for pressure filtration so that the whole time for filtering any sample is a matter of a very few seconds.

Other objects and advantages of the invention will appear from the following description of some preferred forms thereof.

In the drawings:

FIG. 1 is an isometric view of a kit embodying the principles of the invention and containing a series of prepackaged squeeze-filter bottles, a syringe, a large squeeze bottle of reagent, and a group of cuvettes, which may also be obtained separately since they are not consumed in the test.

FIG. 2 is a view in elevation and partly in section showing the step of adding the serum to the first reagent and showing the structure of the syringe.

FIG. 3 is a view in elevation and partly in section showing the bottle of FIG. 2 with its filter cap for filtering the fluid into a cuvette.

FIG. 4 is a view in elevation and in section showing the addition of the next ingredient.

FIG. 5 is a view in elevation and in section of the prepackaged filter-squeeze bottle as sold.

FIG. 6 is a view in elevation and in section of the large squeeze bottle containing the color-producing reagent.

A kit 10 embodying the principles of the invention is shown in FIG. 1. A carton 11 contains at least one large plastic squeeze bottle 12 containing enough color-producing reagent 13 for all the tests, a series of individual one-time-only filter-squeeze bottles 14, each containing a measured amount of reagent 15, a syringe 16, and a series of glass cuvettes 17 for use in a suitable colorimeter.

The syringe 16 may be made from clear plastic, preferably polyethylene, having a cylinder 20 with a chamber 21 and a top lip 22 that can be grasped between two fingers. Its plunger 23 has an O-ring piston 24 that cleanly wipes the interior wall 21a of the cylinder 20. The plunger 23 also has a thumb stop 25 with a lip 26 for pulling when filling the chamber 21. The opposite end of the cylinder 20 has a reduced size capillary tube 27 which preferably extends well beyond the plastic cylinder to provide a long pickup and dispensing orifice 28.

A very important feature of the invention is the provision of a stop member 29, comprising a screw set radially in the cylinder 20 to limit the rearward (or upward) movement of the piston 24. This means that the syringe 16 automatically measures an amount of fluid that is related to the other quantities used in the test.

The syringe 16 preferably comes with the kit 10, its stop 29 determining its capacity as an amount used with that kit. When the kit is exhausted, it can then be thrown away, for the new kit 10 to be purchased will have another related to it. The syringe 16 is an inexpensive item, and there is no need to clean it so long as it is used for the relatively small number of tests for which the kit is used and so long as it is not defiled by impurities but is used for the same thing each time. The capillary is quite small and is included in the measurements, so it does not sufficiently affect the accuracy of the tests to make any significant difference.

In use, after taking a blood sample, the physician normally empties it into the usual vial with an anticoagulant until he is ready to perform the test. Meanwhile, the blood settles so that the plasma is available without centrifuging, and may be easily "picked off" with the stainless steel point of the capillary 27. With the piston 24 bottomed, the syringe capillary 27 is inserted into the serum and then the operator pulls up on the plunger lip 26 while holding the cylinder 20 still, until the piston 24 seats against the stop 29. He then has the exact measured amount of serum 30 for the test to be performed with the rest of the kit 10.

Another important novel feature of the invention is the novel container for the reagent 15 which includes the coagulating agent. The reagent comes in accurately measured quantities, with enough for one test bottle in one plastic squeeze bottle 14 having a novel filtering cap 31 (FIG. 5). The cap 31 comprises a small screw-on plastic unit having a top opening or orifice 32 and provided with filter material 33, which may be filter paper or filter wadding such as absorbent cotton in the small cavity 34. In packaging, each bottle 14 is also provided with a plastic sheet or diaphragm 35 (preferably of Mylar about 0.0005" thick) which seals the bottle and prevents the filter material 33 from being touched in any way by the liquid 15 in the bottle 14. Thus the bottle 14 may be turned upside down accidentally without leakage.

The liquid 15 packaged in the squeeze bottle 14 uses substantially less than the full contents of the bottle 14 in order that the serum 30 may be put into the bottle 14 and the bottle 14 shaken and then used for filtration. In use then, the tube 27 of the filled syringe 16 is inserted into the bottle 14 (FIG. 2) after the cap 31 and diaphragm 35 have been removed, and all the serum 30 is then deposited into the bottle 14 by depressing the syringe plunger 23 to its very end. This puts the measured quantity of serum 30 into the bottle 14 along with the pre-measured quantity of coagulating reagent 15, making a mixture 36. In this way, the use of pipettes is unnecessary for this vital measurement. The bottle 14 is then shaken to mix the mixture 36 well, and the cap 31 is restored with its filter 33 but without the plastic diaphragm 35 between it and the bottle 14.

Then the plastic bottle 14 is inverted over one of the cuvettes 17 (FIG. 3) and is squeezed. The squeeze provides the pressure of filtering which forces a clear filtrate 37 to drop into the cuvette. The doctor simply squeezes until the bottom of the meniscus of the liquid 37 coincides with the lower mark 38 on the cuvette 17. The cuvettes 17 are sold prepared for this test with two marks 38 and 39 on them, the lower one 38 to be used for this stage of the test and the other one 39 at the next stage, as will be seen. The cuvettes 17 themselves being optical glass for use in colorimeters may be separately packaged if desired or may be sold as part of the kit 10, and if suitable plastic or suitable low-cost material is available, they too may be made disposable but this is not usually done.

The doctor now has a measured quantity of filtered serum from which all the protein has been removed and to which a reagent has been added. The next step is to dispense a color producing reagent 13 into the cuvette 17. To do this, the large plastic bottle 12 is employed. (If two or more additional reagents are required, there will be additional such bottles.) Preferably this bottle 12 is of the squeeze type also, but it does not have a filter top because no precipitate is formed in it, the bottle 12 preferably has a plastic cap 40 which may be made as one piece of the capped bottle connected by the strip 41 even when the cap 40 is uncovered. The bottle has a small orifice 42 in it and to use it, it is simply inverted and squeezed. In this instance, the squeezing is done until the liquid reaches the second mark 39 as determined by the bottom of the meniscus.

The mixing, measuring, and adding of all reagents has then all been done without the use of any pipettes. Also, the cuvettes used need not be dry as dilution is made in the cuvette itself and calibration will take into account the small amount of fluid remaining after a simple rinse and drain. To assure good mixing of the material in the cuvette 17, a stopper may be put into the cuvette and the cuvette inverted a few times. If the test is on requiring incubation, the bottle may then be put into a suitable incubator, and if no incubation is required, it may be used immediately. In any event, the only remaining thing is to note the color as developed and this may be done by using any suitable colorimeter for which the cuvette 17 is designed.

As a specific example, consider the method used for uric acid. The small plastic squeeze bottles 14 may each contain 6 ml. of diluted phospholithotungstic acid, all premeasured. (If desired, the test may be done in two steps by using some tungstic acid in one step for the precipitate and phosphoric acid for the next step, but this can be done in one step by the use of phospholithotungstic acid.)

To the plastic squeeze bottle 14 the syringe 16 is used to measure 0.5 ml. of blood serum, the measurement being obtained directly by the syringe. Upon shaking, this produces a precipitate, which is then filtered out while a total of 2.5 ml. of filtrate 37 is put in up to the first mark 38 of the cuvette 17. The coloring reagent 13 may be 10% sodium carbonate, another 2½ ml. being added, bringing the total in the cuvette to 5 ml. The sample may then be incubated at 37° C. for seven to fifteen minutes, typically ten minutes. Instead, it may be left at room temperature for fifteen to thirty minutes. Then the sample is read by reading the color by red light, since the color developed is a type of blue.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A kit for performing chemical tests, comprising a plurality of squeeze bottles each containing an identical pre-measured quantity of reagent and having a removable cap with a top opening and filter material in said cap, whereby upon inversion said squeeze bottle becomes a pressure filter, and means for closing each bottle while preventing contact between said reagent and said filter material; a measuring syringe having a piston-cylinder arrangement with a stop for said syringe limiting intake to a specific amount of liquid, said stop being related to the quantity of reagent in said squeeze bottles, so that when a sample is drawn by said syringe it pre-measures an amount for use with said reagent, each said squeeze bottle having a capacity greater than the total of said pre-measured quantity of reagent therein plus the amount pre-measured by said syringe.

2. The kit of claim 1 having at least one other plastic squeeze bottle containing a different reagent for addition to a filtrate from said pressure filter resulting from filtering the solution that results from adding a charge from said syringe to the reagent pre-measured in an aforestated bottle.

3. The kit of claim 1 having a plurality of identical colorimeter cuvettes, each having a marking line for measuring filtrate from a said squeeze bottle after a syringe pre-measured sample has been added to the reagent in that said squeeze bottle and the resulting solution filtered through the filter material in its said cap.

4. The kit of claim 3 wherein each of said cuvettes has at least two calibrated marking lines, a lower line and an upper line, said kit having a second plastic squeeze bottle containing a second reagent, whereby the said filtrate may be added up to said lower marking line and said reagent added up to said upper line.

5. A test kit, including in combination:
a syringe having stop means limiting removal of liqud to be tested from a source thereof to a preselected maxmum volume, and
a plurality of bottles, each containing an identical pre-measured quantity of a reagent, balanced in amount to the said maximum volume of said syringe, each said bottle having a capacity greater than the total of said quantity and said volume, enabling reaction of said liquid to be tested with said reagent to take place in a said bottle.

6. The test kit of claim 5 wherein there is a filter cap for each said bottle, each said filter cap containing a filter and having an outlet, enabling filtration directly from each said bottle of the reaction product formed by said liquid to be tested and said reagent.

7. The test kit of claim 6 wherein each said bottle is a plastic squeeze bottle, so that when said filter cap is on a said bottle, the bottle can be used as a pressure filter apparatus.

8. A pressure filter unit, comprising a squeeze bottle, a removable one-piece cap therefor having a top portion above the portion securing the cap to the bottle, said top portion having a capacious central recess and a central opening at its upper end, and filter material substantially filling said recess in said cap and removable with it, so that when said bottle is inverted and squeezed, liquid in said bottle is forced through said filter material and out through said opening, leaving any precipitate formerly in said liquid on said filter material.

9. A pressure filter unit, comprising a squeeze bottle, a removable one-piece cap therefor having a top portion above a portion securing the cap to the bottle, said top portion having a capacious central recess and a central opening at its upper end, filter material substantially filling said recess in said cap, and removable means between said cap and said bottle for protecting said filter from contact with liquid in said bottle, so that when said cap and said removable means are removed and said cap restored and said bottle is inverted and squeezed, liquid in said bottle is forced through said filter material and out through said opening.

10. A springless measuring syringe, comprising a cylindrical chamber with a tube smaller in diameter than said chamber, said tube serving as an inlet and outlet tube, and a piston movable in said cylinder and having a wiping-sealing relation to said cylinder for taking in and expelling liquid via said tube, finger grip means at the opposite end of said cylinder from said tube, thumb push and pull means connected to said piston by a rod smaller in cross-sectional area than said piston, and a stop for said piston extending radially through the wall of said cylinder into said cylinder for engaging the rod-side of piston for measuring accurately the amount of liquid taken in on a full stroke to the said stop of said syringe.

11. A measuring syringe, comprising a body with a cylindrical chamber, a capillary tube at one end of said chamber serving as an inlet and outlet tube, finger grip means on said body on the other end from said capillary tube, a piston movable in said clylinder and having a wiping-sealing relation to said cylinder for taking in and expelling liquid via said tube, said piston having a rod with push-pull handle means at the opposite end of said cylinder from said capillary tube, said piston being substantially larger than said rod, and a stop for said piston secured in said cylinder and extending radially through the wall of said chamber for engagement of the rod side of said piston for measuring accurately the amount of liquid taken in on a full stroke to the said stop of said syringe.

References Cited
UNITED STATES PATENTS

| | | | |
|---|---|---|---|
| 3,206,789 | 9/1965 | Krauth | 222—189 X |
| 1,910,236 | 5/1933 | Butler | 23—253 |
| 1,986,403 | 1/1935 | Lehmkuhl | 23—253 XR |
| 2,530,909 | 11/1950 | Riggs | 73—425.6 |
| 2,660,342 | 11/1953 | Ruf | 73—425.6 |
| 2,761,833 | 9/1956 | Ward | 210—282 XR |
| 2,781,312 | 2/1957 | Klumb et al. | 210—282 XR |
| 3,189,223 | 6/1965 | Mackal | 222—189 XR |
| 3,248,017 | 4/1966 | Allen | 222—189 |

MORRIS O. WOLK, *Primary Examiner.*

E. A. KATZ, *Assistant Examiner.*

U.S. Cl. X.R.

23—425.6; 128—224; 210—282, 464; 222—189